Sept. 22, 1959     A. W. CAPS     2,905,052
COPYING CAMERA

Filed Aug. 30, 1956     4 Sheets-Sheet 1

INVENTOR.
ARTHUR W. CAPS
BY
HIS ATTORNEY

Sept. 22, 1959  A. W. CAPS  2,905,052
COPYING CAMERA

Filed Aug. 30, 1956  4 Sheets-Sheet 2

INVENTOR.
ARTHUR W. CAPS
BY
Edward H. Cumpston
HIS ATTORNEY

Sept. 22, 1959 A. W. CAPS 2,905,052
COPYING CAMERA
Filed Aug. 30, 1956 4 Sheets-Sheet 3

INVENTOR.
ARTHUR W. CAPS
BY
HIS ATTORNEY

Sept. 22, 1959     A. W. CAPS     2,905,052
COPYING CAMERA
Filed Aug. 30, 1956     4 Sheets-Sheet 4
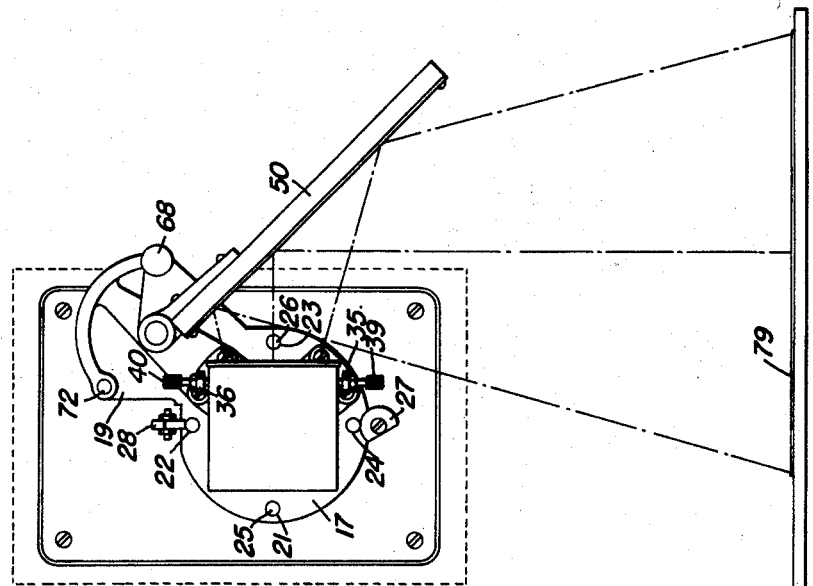
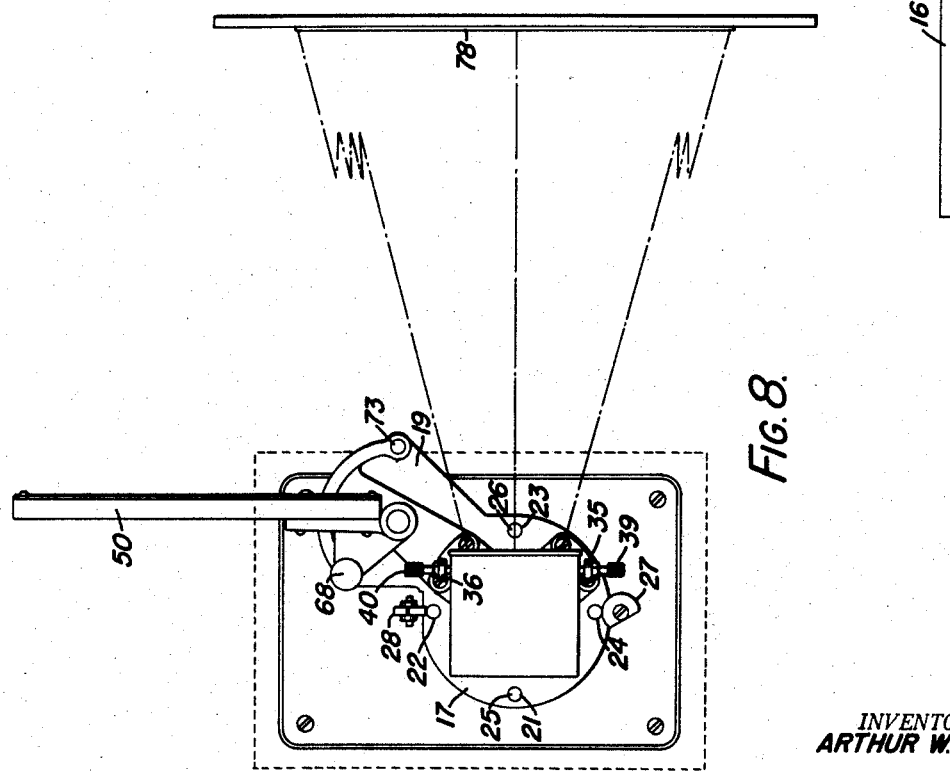
INVENTOR.
ARTHUR W. CAPS
BY
HIS ATTORNEY

United States Patent Office 2,905,052
Patented Sept. 22, 1959

---

2,905,052
COPYING CAMERA

Arthur W. Caps, Rochester, N.Y., assignor to Photostat Corporation, Providence, R.I., a corporation of Rhode Island Application August 30, 1956, Serial No. 607,234

12 Claims. (Cl. 88—24)

This invention relates to cameras and more specifically to those of the variety adapted for use primarily as photographic copying machines, one object of the invention being to provide an improved camera of this description.

Conventional copying cameras, such as that described in Patent No. 2,358,649 generally comprise a horizontal bed supporting a vertical film holder and lensboard connected by flexible bellows. An objective lens is mounted in the lensboard for focusing an image of the object to be copied on the photographic film or plate supported by the film holder. A suitable subject holder, usually in the form of a vertically adjustable horizontal easel is placed beneath the lens, and a right angle prism deflects the rays from the subject to be copied through a right angle and through the lens to the photographic film in the focal plane. The above mentioned parts are relatively adjustable in order to obtain a sharply focused image of the desired size on the photographic film.

The image formed by a lens is inverted, that is, the right of the subject is on the left of the image and the bottom of the subject is on the top of the image. In copying written matter the latter inversion may be corrected by turning the photographic copy over, top to bottom, but the left to right inversion remains, and the final copy is a "mirror image" of the subject. The above mentioned prism corrects this by inverting the image in one direction only, producing a right-reading copy.

Copying cameras of the above description are characterized by two features tending to limit their scope. In the first place, the ratio of reduction of the size of the image to the size of the subject that can be obtained depends on the distance from the lens to the subject. This in turn depends on the range of vertical adjustment of the horizontal subject holder, which is limited by the practical height of such machines. Since it is often desirable to make greatly reduced copies of certain objects, it is another object of this invention to provide an improved copying camera whose ratio of reduction is free of this limitation and which is capable of copying large subjects on a greatly reduced scale.

A second characteristic of conventional cameras is the fact that, due to the effect of the prism described above, all the copies are automatically right-reading. In many cases it is desirable to make an inverted photographic copy for use as a negative for producing right-reading copies by contact printing or other photographic methods. For this reason, it is a further object to provide an improved copying camera adapted for producing either inverted or right-reading copies at will.

Heretofore it has been the common practice to overcome the limiting features referred to above by providing the camera with two separate easels in addition to the usual associated subject holder. Thus for making right-reading prints with a large ratio of reduction, an easel has been placed at one side of and at a distance from the camera and the prism turned at 90 degrees to face the easel. On the other hand, for making reverse-reading prints, with either large or small reduction, another easel has been placed in front of the camera in line with the optical axis of the lens, the prism removed and the easel located at an appropriate distance from the lens. But a practical easel is an expensive piece of equipment comprising a large board for holding large subjects and requiring operation on tracks on the floor and an extended floor space, with lighting facilities to illuminate the subjects and accurate focusing scales to correspond with those on the camera. A further object of the present invention is to provide a camera requiring but a single easel to make it universally adaptable for making prints with either a large or small ratio of reduction in either right-reading or reverse-reading prints.

A still further object is to provide an optical unit for producing a camera of the above description that is simple and reliable in operation, and relatively inexpensive to manufacture.

This application is a continuation of my copending application, Serial No. 414,960, filed March 9, 1954, Copying Camera, now abandoned.

To these and other ends the invention resides in certain improvements and combinations of parts, all as will be hereinafter more fully described, the novel features being pointed out in the claims at the end of the specification.

In the drawings:

Fig. 8 is an enlarged front elevational view of the optical system of Fig. 1 arranged for copying large subjects and obtaining a right-reading copy thereof;

Fig. 9 is an enlarged front elevational view of the optical system arranged for copying small subjects and obtaining an inverted copy thereof;

Figure 1:
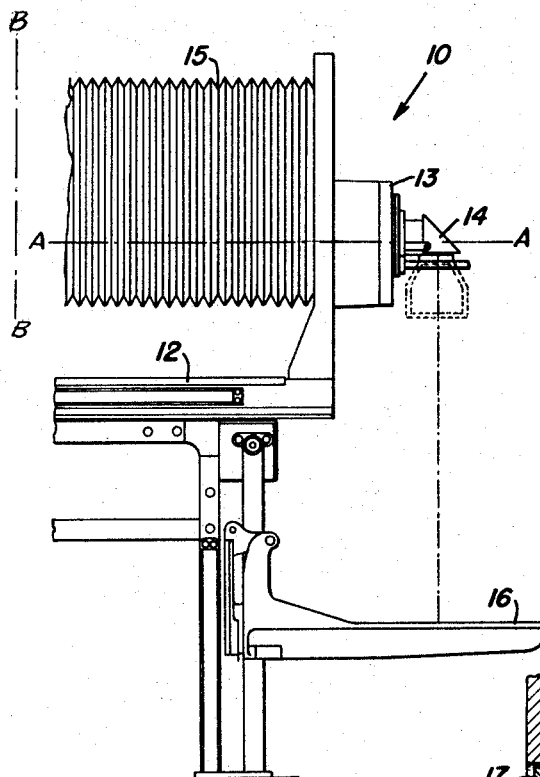
Fig. 1 is a fragmentary side elevational view of a copying camera fitted with an optical system embodying the present invention.

A portion of a camera embodying the present invention and disclosed by way of illustration, is shown generally at 10 in Fig. 1. Camera 10 comprises a horizontal frame 12 and a lensboard portion 13 carrying an optical unit 14 connected to an opaque flexible bellows 15. A horizontal easel or subject holder 16 is mounted on a vertical track beneath the optical unit 14, and is adapted to be adjusted vertically to position the subject to be copied in proper relation to said unit. All of the parts with exception of the said unit are more fully described in detail in Landrock and Caps Patent No. 2,,358,649.

Figure 6:
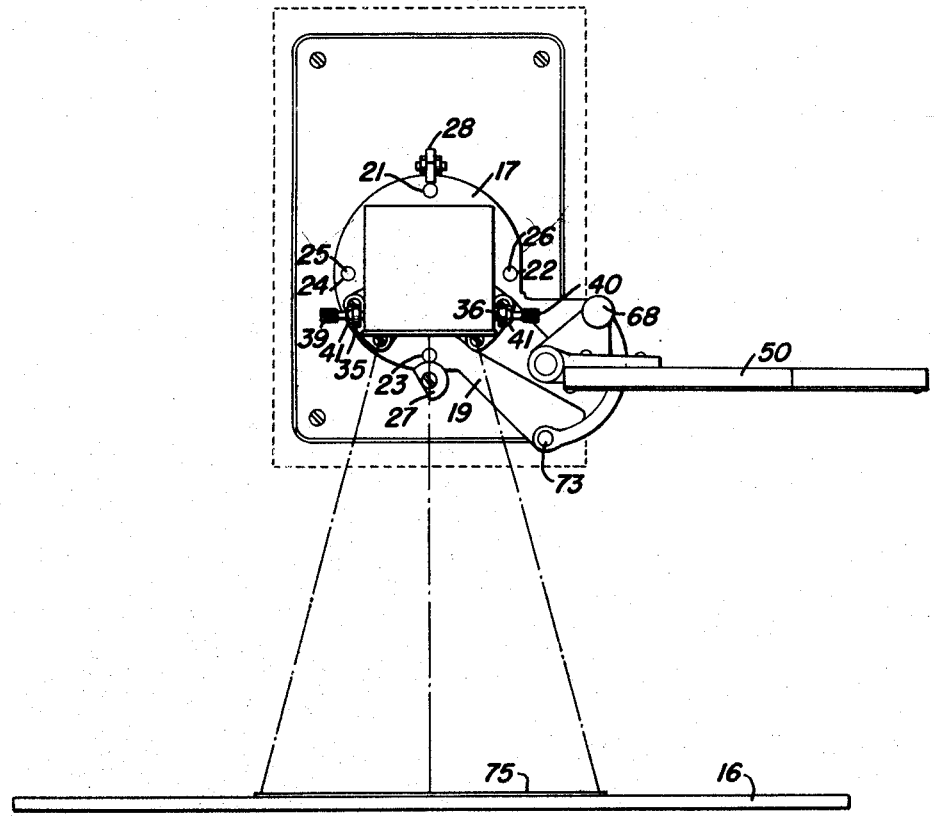
Fig. 6 is an enlarged front elevational view of the optical system of Fig. 1 arranged for copying small subjects and obtaining a right-reading copy thereof.
Figure 7:
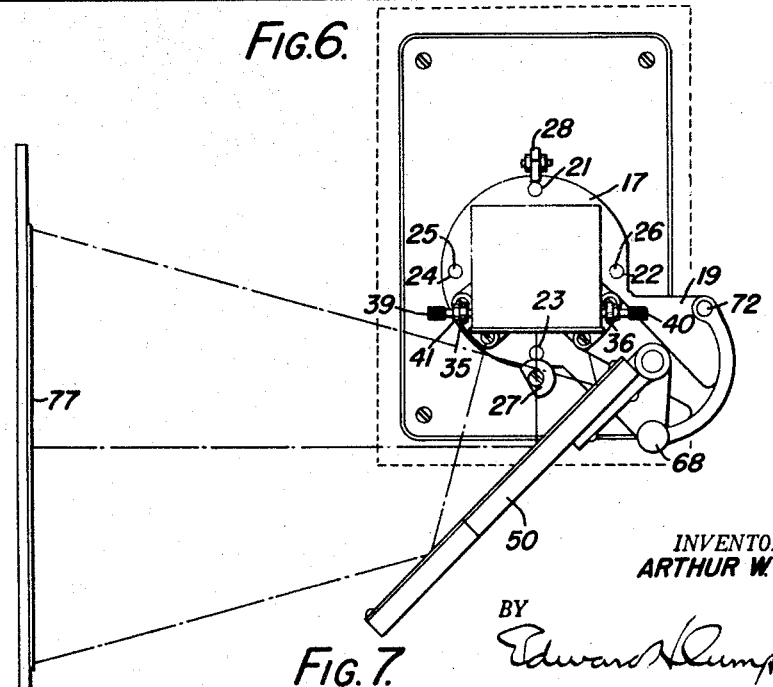
Fig. 7 is an enlarged front elevational view of the optical system of Fig. 1 arranged for copying large subjects and obtaining a greatly reduced, inverted copy thereof.

Optical unit 14 comprises a base member or lens mount 17 (Fig. 3) preferably in the form of a substantially flat, irregularly shaped casting having a circular portion with a centrally located round hole 18 for receiving a lens adaptor and lens means, and a substantially triangular, laterally extending portion 19 for carrying the mirror assembly, as will be hereinafter more fully described. The circular portion of base 17 contains four equally spaced sockets or holes 21 to 24 near the edge thereof to receive mounting pins. The base is mounted on lensboard 13 on two pins, 25 and 26 (Fig. 10), engaging two diametrically opposite ones of the above described holes, which may be either holes 22 and 24 as shown in Figs. 6 and 7, or holes 21 and 23 as shown in Figs. 8 and 9. In either position, the base is held releasably in place by a cam 27 and a latch 28, so that it may be conveniently demounted and remounted in another angular position about the optical axis, for reasons that will be disclosed below.

Figure 12:
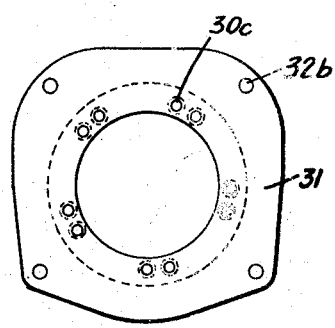
Fig. 12 is a plan view of a lens adaptor plate.
Figure 10:
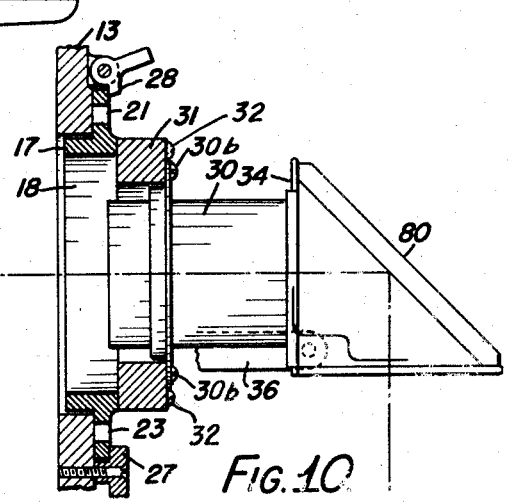
Fig. 10 is an enlarged side sectional elevation of the lens and associated parts removed from the camera for clarity.
Figure 11:
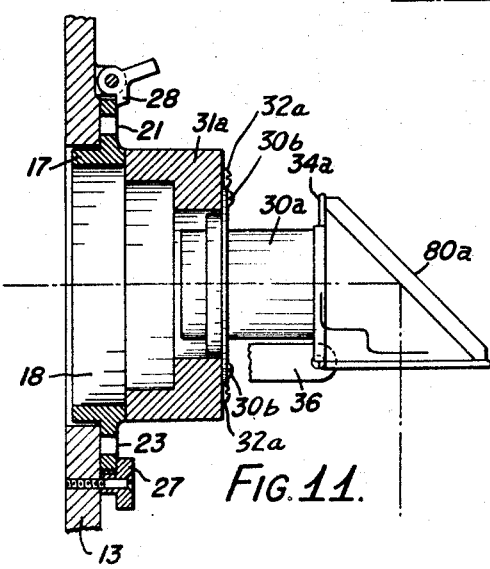
Fig. 11 is a view of a lens system similar to Fig. 10, employing a smaller lens.

A lens tube 30 (Fig. 10) has a flange mounted by screws 30b engaging in holes 30c in a flat irregularly shaped adaptor plate 31 (Figs. 10 and 12) which is fastened to the circular part of base 17 by screws 32 passing through holes 32b in plate 31 and holes 32c in base 17, the tube containing lenses having an optical axis A and a focal plane B (Fig. 1). Adaptor plate 31 may be furnished in several thicknesses as shown in Figs. 10 and 11 to compensate for lenses of various focal length as will be hereinafter more fully described.

A right angle prism 34 is mounted on the front of lens tube 30 with one of its short faces parallel to and closely adjacent the front of said tube. A pair of outwardly projecting posts 35 and 36 (Figs. 2 and 3), fastened to base 17, extend parallel to and adjacent the triangular side faces of prism 34, and carry threaded adjusting screws 39 and 40, each of which carries a locking nut 41 (Figs. 6 to 9). Screws 39 and 40 engage prism 34 on opposite sides, and when locked in position by means of nuts 41, hold prism 34 rigidly in position. An integral boss 45 (Figs. 2 and 4), cast on the laterally projecting portion 19 of base 17, comprising a hollow cylindrical extension whose axis is substantially perpendicular to the plane of base 17, carries a cylindrical mirror post 46 secured by pin 47, parallel with and at one side of the optical axis as shown. Post 46 carries a mirror assembly shown generally at 48 in Fig. 2.

Figure 2:
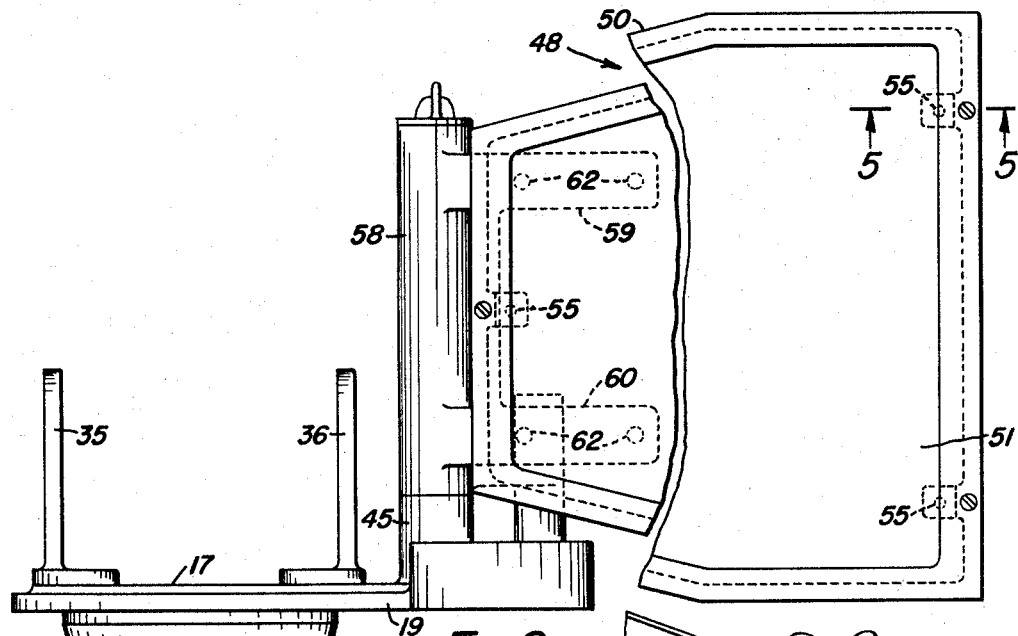
Fig. 2 is an enlarged bottom plan view of a portion of the optical system of Fig. 1 removed from the camera for sake of clarity.
Figure 5:
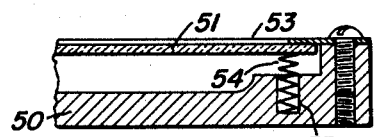
Fig. 5 is an enlarged fragmentary sectional view taken substantially along line 5—5 in Fig. 2.
Figure 3:
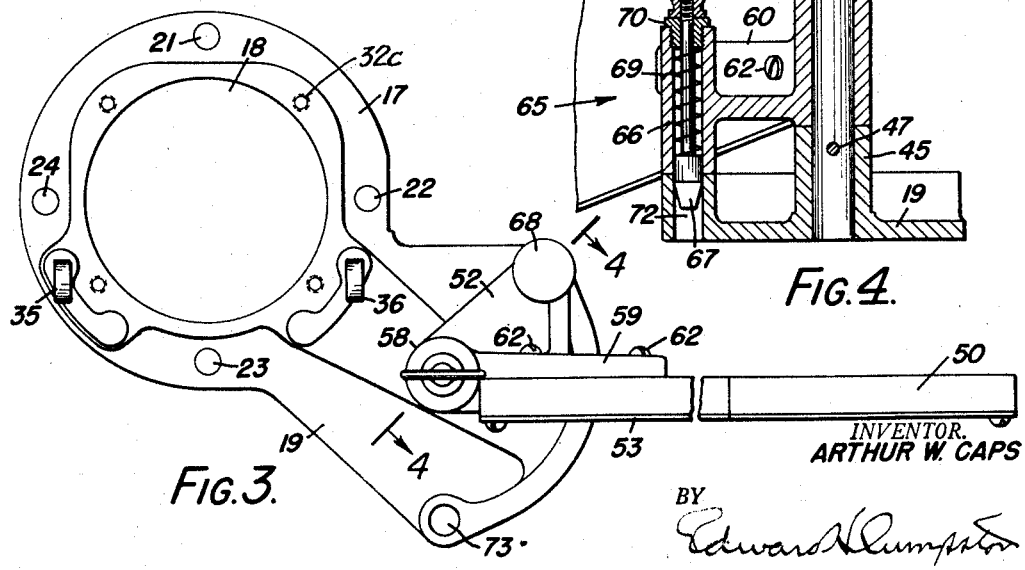
Fig. 3 is a front elevational view of the portion of the optical system of Fig. 2.

Mirror assembly 48 comprises a substantially trapezoidal frame member 50 supporting a first-surface or front silvered plane mirror 51, and a bracket member 52 (Fig. 3). Mirror 51 is mounted in frame 50 with its outer edges engaging flange 53 and is resiliently held in contact therewith by a plurality of small coil springs 54 in holes 55 in the edge portion of frame 50, as shown in Figs. 2 and 5. This resilient method of mounting assures positive positioning of mirror 51, but protects it from stresses that would otherwise be set up by the difference in the coefficients of expansion of the glass mirror and the metal frame by changes in temperature, and thereby eliminates any warpage of the reflecting surface that would distort the image reflected thereby.

Figure 4:
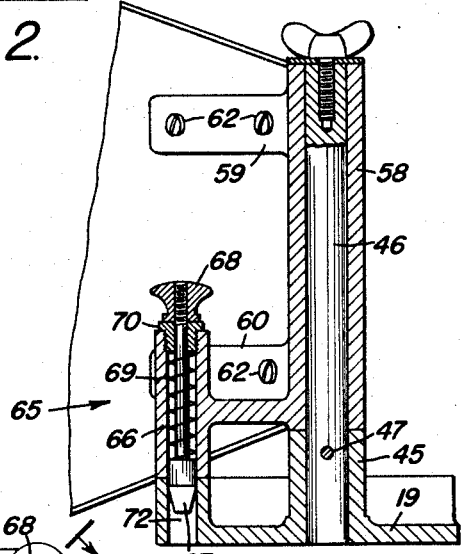
Fig. 4 is a sectional view taken substantially along line 4—4 in Fig. 3.

Bracket 52 comprises a hollow cylindrical bearing portion 58 fitting on mirror post 46 and two laterally extending lugs 59 and 60 (Figs. 2 and 4) which are fastened to frame member 50 by means of screws 62. A mirror detent assembly, shown generally at 65 in Fig. 4, is mounted on the cylindrical portion 58 and lower lug 60. Detent assembly 65 comprises a hollow cylindrical portion 66 containing sliding plunger 67 the upper end of which is threadedly fastened to knob 68. Plunger 67 is forced downwardly by a spring 69 which bears against the shoulder thereof and against threaded plug 70 which also serves to hold the plunger and spring in place. The entire mirror assembly 48 may be rotated about mirror post 46, but may be detachably held in either of two positions by the lower end of plunger 67 which engages either one of two sockets or holes 72 and 73, drilled for this purpose in base 17, as will be hereinafter described.

Base 17 is normally mounted on lensboard 13 in the manner shown in Figs. 6 and 7, with the free short face of prism 34 lying in a substantially horizontal plane, and with mirror post 46 below and to the right of the lens and prism. Mirror 51 is rotated bodily on mirror post 46 about one of its side edges to position away from the path of light entering prism 34 and detachably locked in place by plunger 67 engaging hole 72 in base extension 19, as shown in Fig. 6. In this inoperative position, the prism reflects the image directly through the lens means to the focal plane and the camera is adjusted to make right-reading copies of a subject 75 placed on horizontal easel or subject holder 16, as is more fully described in the above mentioned patent to Landrock and Caps.

Where a reduced inverted copy of a large subject is to be made, mirror 51 is swung into position and locked under the free face of prism 34, with the surface of said mirror at an angle of substantially 45 degrees with the horizontal, as shown in Fig. 7. The mirror is now in a position to reflect horizontal rays of light up into the prism to form an inverted image of a subject 77 placed on a vertical support to the left of the camera, as shown in the figure. Since the distance at which subject 77 can be placed from the camera is limited only by the size of the room in which the camera is placed, practically any size subject may be copied at any desired ratio of reduction.

Base or lens mount 17 may also be mounted on lensboard 13 at right angles to the above position with pins 25 and 26 engaging holes 21 and 23, as described above, and shown in Figs. 8 and 9. In this position the free face of prism 34 is in a substantially vertical plane, and mirror assembly 48 is above and to the right of the lens and prism. When the mirror assembly is swung out of the path of horizontally traveling light entering prism 34, as shown in Fig. 8, the prism reflects the image directly through the lens means to the focal plane and the camera is adjusted to make right-reading copies of a subject 78 supported in a vertical plane on the right of the camera. In this position, any desired ratio of reduction can be effected by moving subject 78 to any desired distance from the camera.

When base 17 is in this position, and mirror assembly 48 is swung into a position with its surface at an angle of substantially 45° with the front face of prism 34, as shown in Fig. 9, vertically traveling light rays from a subject 79 placed on horizontal easel 16 will be reflected into said prism. In this position, the camera is adapted to make inverted copies of subject 79 placed on easel 16, as shown in Fig. 9.

Provision is made for the use of lenses of varying focal length by means of adaptor plates 31, described above. These plates are provided in various thicknesses to correspond to each size of lens and prism supplied, the thickness of each plate being such that the center of the long or diagonal face 80 of prism 34 is in line with the center of mirror 51, as may be seen in Fig. 1 and by a comparison of Fig. 10 with Fig. 11. The latter figure shows a shorter lens tube 30a of different focal length and prism 34a mounted on a thicker adaptor 31a. The thicker adaptor 31a of Fig. 11 compensates for the difference in sizes of the respective lenses and the prisms 34 and 34a, thereby maintaining the alignment of the face of the prism with the mirror.

It will be seen from the foregoing that by means of the adjustment of base 17 and the mirror assembly 48 as described above, either a right-reading or an inverted copy may be made of subjects either placed in horizontal position on the easel 16, or in vertical position on any suitable carrier or easel. Thus, either type of copy may be made of any sized subject desired without the limitations heretofore imposed by the limited range of the vertical adjustment of the horizontal subject holders. This imparts greatly increased flexibility to the standard type of copying camera which is extensively used in the industry.

The location and support of the lens means, prism and mirror all on the same integral lens mount 17 insures maintenance of the proper positioning and accurate adjustment of these parts in use.

The invention provides an optical unit comprising lens mount, lens, prism and mirror for attachment to the camera in the same place and in the same manner as the standard unit of lens mount, lens and prism and without additional fastening means. Thus, a standard camera can be economically manufactured under the existing production schedule and furnished with either of the standard lens mount, lens and prism unit, or the unit of the present invention, or both units, to suit the intended use of the camera and make it universally adaptable both for a substantial range in the ratio of reduction and for making either direct or reverse-reading prints, with a minimum of easel equipment, floor space, lighting requirements and expense.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. The combination with a right angle camera for producing right and reverse reading copies comprising lens means, a first reflecting means for receiving light incident directly thereon from a direction transverse to the optical axis of said lens means and reflecting the same along said axis for producing right-reading copies of subjects located laterally of said axis, a second reflecting means mounted on said camera for movement about an axis parallel with said lens axis to an inoperative position out of the path of said incident light whereby said first reflecting means in conjunction with said lens means produces said right-reading copies and also to an operative position facing said first reflecting means for receiving light incident thereon from a direction transverse to said axis and reflecting the same to said first reflecting means for producing reverse-reading copies of subjects located laterally of said axis, to adapt said camera for making either right-reading or reverse-reading copies of subjects to be photographed.

2. The combination with a right angle camera for producing right and reverse reading copies comprising lens means, a first reflecting means for receiving light incident thereon directly from a subject in one direction transverse to the optical axis of said lens means and reflecting the same along the axis of said lens means for producing right-reading copies of subjects located laterally of said axis, a second reflecting means mounted on said camera for movement to an inoperative position out of the path of said incident light whereby said first reflecting means in conjunction with said lens means produces said right-reading copies of said subjects and also to an operative position facing said first reflecting means for receiving light thereon from a subject in a second direction transverse to the first mentioned direction and said lens axis and reflecting the same to said first reflecting means for producing reverse-reading copies of said subject, to adapt said camera for making either right-reading or reverse-reading copies of subjects to be photographed.

3. The combination with a right angle camera for producing right and reverse reading copies comprising lens means, a first reflecting means for receiving light incident thereon directly from one subject in one direction transverse to the optical axis of said lens means and reflecting the same along said axis for producing right-reading copies of said subject, a second reflecting means pivotally mounted on said camera to swing about an axis parallel with said lens axis to an inoperative position out of the path of said incident light whereby said first reflecting means in conjunction with said lens means produces said right-reading copies and also to an operative position facing said first reflecting means for receiving light thereon from a second subject in a second direction transverse to the first mentioned direction and said lens axis and reflecting the same to said first reflecting means for producing reverse-reading copies of said second subject, to adapt said camera for making right-reading and reverse-reading copies of different subjects in different directions transverse to said optical axis.

4. The combination with a right angle camera for producing right and reverse reading copies comprising a lens mount provided with lens means, a first reflecting means on said mount for receiving light incident thereon directly from a subject in one direction transverse to the optical axis of said lens means and reflecting the same along said axis for producing right-reading copies of said subject, a second reflecting means pivotally mounted on said mount to swing to an inoperative position out of the path of said incident light whereby said first reflecting means in conjunction with said lens means produces said right-reading copies and also to an operative position facing said first reflecting means for receiving light thereon from a subject in a second direction transverse to the first mentioned direction and said lens axis and reflecting the same to said first reflecting means for producing reverse-reading copies of said second subject, to adapt said camera for making right-reading and reverse-reading copies of said subjects located in different directions from said optical axis, and means on said mount for locating and releasably securing said second reflecting means in each of said positions.

5. The combination with a right angle camera for producing right and reverse reading copies comprising a lens mount thereon provided with lens means, said mount being movable to positions at 90° with one another about the optical axis of said lens means, a first reflecting means on said mount for receiving light incident thereon directly from a subject and reflecting the same along said axis for producing right-reading copies of said subject, a second reflecting means pivotally mounted on said lens mount to swing to an inoperative position out of the path of said incident light whereby said first reflecting means in conjunction with said lens means produces said right-reading copies and also to an operative position facing said first reflecting means for receiving light thereon directly from a subject and reflecting the same to said first reflecting means for producing reverse-reading copies of said subject, to adapt said camera for making right-reading and reverse-reading copies of subjects to be photographed, and means on said mount for locating and releasably securing said second reflecting means in each of said positions.

6. The combination with a right angle camera for producing right and reverse reading copies comprising a lens mount thereon provided with lens means, said mount being movable to positions at 90° with one another about the optical axis of said lens means, a first reflecting means on said mount, said mount being movable on said camera to position said first reflecting means for receiving light directly from subjects in either of different directions transverse to said lens axis and reflecting the same along said axis for producing right-reading copies of said subjects, a second reflecting means pivotally mounted on said mount to swing to an inoperative position out of the path of light incident on said first reflecting means whereby said first reflecting means in conjunction with said lens means produces said right-reading copies and also to an operative position facing said first reflecting means for receiving light thereon from either of different directions transverse to the direction of light incident on said first reflecting means and to said lens axis and reflecting the same to said first reflecting means for making reverse-reading copies of subjects to be photographed, to adapt said camera for making right-reading or reverse-reading copies thereof, means for releasably securing said mount in said different positions, and means for releasably securing said second reflecting means in each of said positions.

7. The combination with a right angle camera for producing right and reverse reading copies comprising a lens mount thereon provided with lens means, said mount being movable to positions at 90° with one another about the optical axis of said lens means, a prism on said mount for reflecting light along the axis of said lens means for producing right-reading copies of subjects to be photographed, said mount being movable on said camera to locate said prism in said different positions for receiving light from different directions, a mirror pivotally mounted on said mount to swing to an inoperative position out of the path of light incident on said prism whereby said prism in conjunction with said lens means produces said right-reading copies and also to an operative position facing said prism on said mount for receiving light from a direction transverse to the direction of light incident on said prism and reflecting the same to said prism for reflection thereby to said lens means for producing reverse-reading copies of said subjects, pin and socket means for releasably locating and securing said mount in said different positions of adjustment on said camera, post and bearing means for pivotally supporting said mirror on said mount and plunger and socket means for releasably locating and securing said mirror in said different positions thereof.

8. A right angle camera for producing right and reverse reading copies comprising a focal plane and a subject holder disposed at right angles to each other, an optical unit between said focal plane and subject holder comprising a lens mount, lens means on said lens mount, a prism on said lens mount having a reflecting surface disposed at 45 degrees to the axis of said lens means for reflecting the image of a subject on said holder directly through said lens means to said focal plane for producing right-reading copies of said subject, and a mirror pivotally mounted on said lens mount for movement toward and from position facing said prism surface for reflecting the image of a subject on said holder to the reflecting surface of said prism for producing reverse-reading copies of said subject, to adapt said camera for making either right-reading or reverse-reading copies of said subject.

9. A right angle camera for producing right and reverse reading copies comprising a lensboard, a lens mount of substantially plane shape provided with lens means and with a first reflector having its face disposed at an angle of 45° to the optical axis of said lens means for reflecting light therealong for producing right-reading copies of subjects to be photographed, means for supporting said lens mount on said lensboard for rotary adjustment to positions at 90° with one another about said axis to position said reflector for receiving light from horizontal and vertical directions, respectively, and reflecting the same through said lens means, a second reflector supported on said lens mount for adjustment to and from position facing said first reflector face to receive images of said subjects projected in horizontal and vertical directions and reflect the same to said first reflector for reflection thereby through said lens means, and means for releasably securing said lens mount and said second reflector in said adjusted positions thereof.

10. A right angle camera for producing right and reverse reading copies comprising a focal plane, a lensboard and a horizontal subject holder disposed at right angles to said focal plane, an optical unit comprising a lens mount provided with lens means and with a first reflector having its face disposed at an angle of 45° to the axis of said lens means, means for supporting said optical unit on said lensboard for adjustment to dispose said first reflector in positions at 90° with one another about the axis of said lens means to receive light projected vertically from a subject on said horizontal holder and light projected horizontally from a subject on a holder disposed at right angles to said focal plane and laterally of said axis and to project the same along said axis to produce right-reading copies of said subjects, a second reflector supported on said unit for movement to and from position facing said first reflector face to receive images of subjects incident thereon in a horizontal direction when said first reflector is disposed to receive vertically projected light and incident thereon in a vertical direction when said first reflector is disposed to receive horizontally projected light, and to reflect the same to said first reflector and along said axis to produce reverse-reading copies of said subjects, and means for releasably securing said unit and said second reflector in said positions thereof, to adapt said camera for making either right-reading or reverse-reading copies of said subjects in either of said positions thereof.

11. A right angle camera for producing right and reverse reading copies comprising a focal plane, a lensboard and a horizontal subject holder disposed at right angles to said focal plane, a lens mount of substantially plane shape provided with lens means and with a prism having its reflecting face disposed at an angle of 45° to the optical axis of said lens means for reflecting light therealong for producing right-reading copies of subjects to be photographed, means supporting said lens mount on said lensboard for adjustment to locate said prism in positions at 90° with one another about the axis of said lens means to receive light projected vertically from a subject on said horizontal holder and light projected horizontally from a subject on a holder disposed at right angles to said focal plane and laterally of said axis and to project the same along said axis to produce right-reading copies of said subjects, a first surface mirror supported on said lens mount for movement to and from position facing said prism face to receive images of subjects incident thereon in a horizontal direction when said first reflector is located to receive vertically projected light and incident thereon in a vertical direction when said prism is located to receive horizontally projected light and to reflect the same to said first reflector along said axis to produce reverse-reading copies on said subjects, and detent means for releasably securing said lens mount on said lensboard and said mirror on said lens mount in said positions thereof, to adapt said camera for making either right-reading or reverse-reading copies of said subject in either of said positions thereof.

12. A camera for producing right and reverse reading copies comprising a focal plane, a subject holder disposed at right angles to said plane and an optical unit on said camera between said focal plane and subject holder, said unit comprising a lens mount, lens means on said lens mount, a first reflector on said lens mount having a reflecting surface disposed at 45 degrees to the optical axis of said lens for directly reflecting the image of a subject through said lens means to said focal plane to produce a right-reading copy of said subject, a second reflector pivotally supported on said lens mount for movement to and from position facing said first reflector surface for reflecting a reversed image directly from said subject to said first reflector for producing a reverse-reading copy of said subject, means for adjusting said optical unit about said axis to different positions spaced from one another by angles of 90 degrees about said axis, for making either right-reading or reverse-reading copies of subjects on said holder and in planes perpendicular thereto and to said focal plane, and means for releasably securing said unit and said second reflector in said adjusted positions thereof.

References Cited in the file of this patent

UNITED STATES PATENTS

| | | |
|---|---|---|
| 1,644,781 | Holman | Oct. 11, 1927 |
| 1,821,129 | Weisker | Sept. 1, 1931 |
| 1,895,654 | Forrest | Jan. 31, 1933 |
| 2,275,905 | Huebner | Mar. 10, 1942 |
| 2,282,656 | Huebner | May 12, 1942 |
| 2,468,935 | Langdon | May 3, 1949 |